United States Patent
Kamiya et al.

(10) Patent No.: US 9,709,093 B2
(45) Date of Patent: Jul. 18, 2017

(54) SLIDING MEMBER

(71) Applicant: TAIHO KOGYO CO., LTD., Toyota-shi, Aichi (JP)

(72) Inventors: Shu Kamiya, Toyota (JP); Toshiyuki Chitose, Toyota (JP); Takashi Tomikawa, Toyota (JP); Yasunori Kabeya, Toyota (JP); Taichi Yoshimi, Toyota (JP)

(73) Assignee: Taiho Kogyo Co., Ltd. (JP)

( * ) Notice: Subject to any disclaimer, the term of this patent is extended or adjusted under 35 U.S.C. 154(b) by 44 days.

(21) Appl. No.: 14/768,105

(22) PCT Filed: Feb. 14, 2014

(86) PCT No.: PCT/JP2014/053483
§ 371 (c)(1),
(2) Date: Nov. 23, 2015

(87) PCT Pub. No.: WO2014/126202
PCT Pub. Date: Aug. 21, 2014

(65) Prior Publication Data
US 2016/0091022 A1    Mar. 31, 2016

(30) Foreign Application Priority Data

Feb. 15, 2013 (JP) .................. 2013-027955

(51) Int. Cl.
| | | |
|---|---|---|
| F16C 33/10 | (2006.01) |
| F16C 33/20 | (2006.01) |
| C09D 179/08 | (2006.01) |
| C09D 159/00 | (2006.01) |
| C09D 161/06 | (2006.01) |

(Continued)

(52) U.S. Cl.
CPC .......... F16C 33/1095 (2013.01); B32B 15/00 (2013.01); B32B 27/00 (2013.01);
(Continued)

(58) Field of Classification Search
CPC .... F16C 33/046; F16C 33/122; F16C 33/124; F16C 33/125; F16C 33/20–33/206
See application file for complete search history.

(56) References Cited

U.S. PATENT DOCUMENTS 4,896,368 A * 1/1990 Just ................ F16C 33/12
                                          384/276
6,120,187 A * 9/2000 Ono ................ F16C 9/04
                                          384/273

(Continued)

FOREIGN PATENT DOCUMENTS

CN      102171465 A    8/2011
DE   10-2008-055-194 A1  7/2010

(Continued)

OTHER PUBLICATIONS

Extended European Search Report for Application No. EP 14 75 1585 dated Oct. 6, 2016 (9 pages).

(Continued)

*Primary Examiner* — Thomas R. Hannon
(74) *Attorney, Agent, or Firm* — Harness, Dickey & Pierce, P.L.C.

(57) ABSTRACT

Bearing 13 has lining layer 17 that is formed of an alloy having a predetermined shape and that has chamfered portion 25, and overlay layer 19 that is formed of a resin on an inner circumferential surface of lining layer 17, the inner circumferential surface sliding relative to a mating shaft, and that covers at least a portion of chamfered portion 25.

24 Claims, 3 Drawing Sheets

(51) Int. Cl.

| | |
|---|---|
| *C09D 163/00* | (2006.01) |
| *B32B 15/00* | (2006.01) |
| *B32B 27/00* | (2006.01) |
| *B32B 27/06* | (2006.01) |
| *C08G 73/14* | (2006.01) |
| *C10M 125/00* | (2006.01) |
| *F16C 17/02* | (2006.01) |

(52) U.S. Cl.
CPC .............. *B32B 27/06* (2013.01); *C08G 73/14* (2013.01); *C09D 159/00* (2013.01); *C09D 161/06* (2013.01); *C09D 163/00* (2013.01); *C09D 179/08* (2013.01); *C10M 125/00* (2013.01); *F16C 33/201* (2013.01); *F16C 33/206* (2013.01); *B32B 2307/50* (2013.01); *B32B 2307/746* (2013.01); *C10M 2201/041* (2013.01); *C10M 2201/061* (2013.01); *C10M 2201/062* (2013.01); *C10M 2201/065* (2013.01); *C10M 2201/066* (2013.01); *C10M 2209/003* (2013.01); *C10M 2213/062* (2013.01); *C10M 2217/003* (2013.01); *C10M 2217/044* (2013.01); *C10M 2221/003* (2013.01); *C10N 2230/06* (2013.01); *C10N 2240/02* (2013.01); *C10N 2250/141* (2013.01); *F16C 17/02* (2013.01); *F16C 2240/50* (2013.01)

(56) References Cited

U.S. PATENT DOCUMENTS

| | | | |
|---|---|---|---|
| 6,273,612 B1 | 8/2001 | Ono et al. | |
| 6,634,791 B2* | 10/2003 | Ono | F16C 33/1065 384/288 |
| 6,669,371 B2* | 12/2003 | Tanaka | F16C 23/041 384/279 |
| 2002/0126924 A1 | 9/2002 | Okamoto et al. | |
| 2011/0164840 A1 | 7/2011 | Hayashi et al. | |
| 2011/0268944 A1 | 11/2011 | Adam et al. | |

FOREIGN PATENT DOCUMENTS

| | | |
|---|---|---|
| EP | 1522750 A1 | 4/2005 |
| JP | H07-238936 A | 9/1995 |
| JP | 2000-018253 A | 1/2000 |
| JP | 3388501 B2 | 3/2003 |
| JP | 2005-265043 A | 9/2005 |
| JP | 2010-196813 A | 9/2010 |
| WO | WO-2010-038588 A1 | 4/2010 |

OTHER PUBLICATIONS

Chinese Office Action for Application No. 2014-80020890.0 dated Dec. 2, 2016 with English translation (14 pages).

* cited by examiner

SLIDING MEMBER

TECHNICAL FIELD

The present invention relates to a sliding member.

RELATED ART

Sliding bearings are used as main bearings and the like for automobile engines and other industrial machinery engines. A sliding bearing has a metal backing and a lining layer (bearing alloy layer) and is processed into the shape of a cylindrical or a half bearing. Two half bearings are joined together and used as a cylindrical bearing. Sliding bearings of this type raise concerns about misalignment, coaxiality, and the like of a mating shaft, and there are cases where local contact between a mating shaft and a sliding bearing occurs. Thus, a bearing that addresses problems caused by local contact has been developed (see Patent Document 1, for example).

FIG. 6 is a cross-sectional view taken along the axis of half bearing 505 described in Patent Document 1. Half bearing 505 has metal backing 507, bearing alloy 509, and overlay layer 511. Crowning (gentle slope) 513 is provided in both end portions of bearing alloy layer 509 with respect to the axial direction. Overlay layer 511 is formed in a region on bearing alloy 509 including crowning 513.

CITATION LIST

Patent Documents

Patent Document 1: JP 3388501 B

SUMMARY

Technical Problem

In Patent Document 1, the surface of overlay layer 511 is flat (level). Thus, there are cases where, if a mating shaft causes edge loading, an excessive load is applied to an end portion with respect to the axial direction, resulting in separation of overlay layer 511.

To address this issue, the present invention provides a sliding member that suppresses separation of an overlay layer.

Solution

The present invention provides a sliding member including a lining layer having a sliding surface that slides relative to a mating shaft and a chamfered portion that is provided in an end portion of the sliding surface with respect to an axial direction, and an overlay layer that is formed of a resin and that covers at least a portion of the chamfered portion.

The overlay layer may have a crowning shape that slopes toward the end portion with respect to the axial direction from a slope starting position that is a position at which a distance from an end surface with respect to the axial direction is shorter than W/2, W being a width of the lining layer in the axial direction.

In the overlay layer, a difference in height between the slope starting position and a position of the end portion of the sliding surface with respect to the axial direction may be equal to or less than 6 μm.

The overlay layer may include a binder resin and at least one of a solid lubricant and a hard material.

The binder resin may include at least one of a polyamideimide resin, a polyimide resin, an epoxy resin, a phenolic resin, a polyacetal resin, a polyetheretherketone resin, and a polyphenylene sulfide resin.

The solid lubricant may include at least one of $MoS_2$, PTFE, graphite, $WS_2$, h-BN, and $SB_2O_3$.

The hard material may include at least one of SiC, $Al_2O_3$, TiN, AlN, $CrO_2$, $Si_3N_4$, $ZrO_2$, and P.

Effects of Invention

According to the sliding member of the present invention, separation of the overlay layer can be suppressed.

DESCRIPTION

1. Structure

Figure 1:
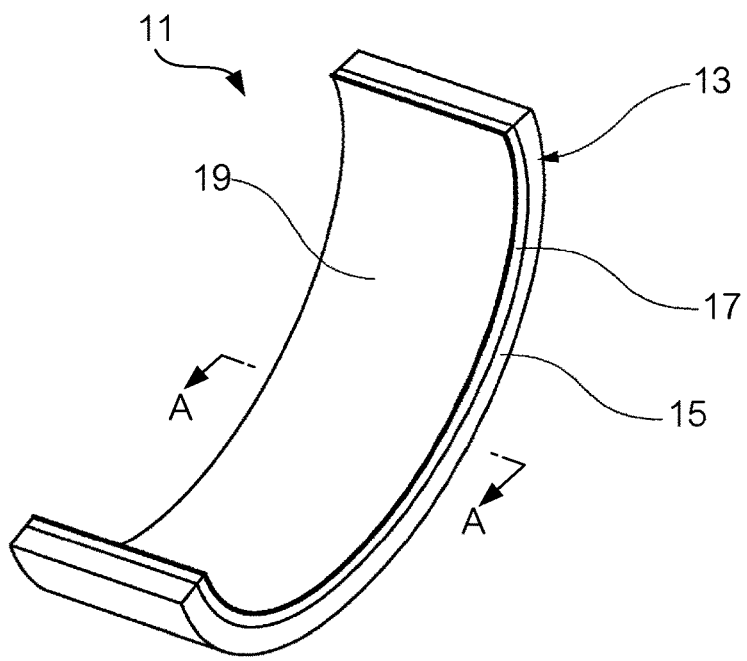
FIG. 1 is a perspective view of half bearing 13 according to an embodiment.

FIG. 1 shows the structure of main bearing (sliding bearing) 11 according to an embodiment. Main bearing 11 is an example of a sliding member, and may be used as a bearing between a crankshaft and a connecting rod, or the crankshaft and an engine block, of an internal combustion engine, for example. Main bearing 11 is constituted by two half bearings 13. Joining two half bearings 13 together provides a cylindrical bearing. It should be noted that FIG. 1 shows only a single half bearing 13.

Half bearing 13 has metal backing 15, lining (bearing alloy) layer 17, and overlay layer 19. Metal backing 15 is the layer for reinforcing the mechanical strength of lining layer 17. Metal backing 15 may be formed of steel, for example. Lining layer 17 is provided along a sliding surface (surface that comes into contact with a shaft) of the bearing. Lining layer 17 is the layer for providing bearing properties, that is, for example, properties such as frictional characteristics (sliding characteristics), seizure resistance, wear resistance, conformability, embeddability (robustness against foreign matter), corrosion resistance, and the like. Lining layer 17 is formed of a bearing alloy. To prevent adhesion to the shaft, so-called "co-alloy (co-material)", that is, the bearing alloy and the shaft being made of similar composition metals (materials) is avoided, and materials different from those for the shaft are used for the bearing alloy. In this example, the bearing is to be used for a shaft that is formed of steel, and so an aluminum alloy or a copper alloy may be used as the bearing alloy.

Overlay layer 19 is the layer for improving the properties of lining layer 17 such as the friction coefficient, conformability, corrosion resistance, embeddability (robustness against foreign matter), and the like. Overlay layer 19 contains a binder resin and at least one of a solid lubricant and a hard material that are dispersed in the binder resin. It should be noted that preferably, overlay layer 19 is constituted by the solid lubricant (30 to 70 vol %), the hard material (0 to 5%), and the binder resin (balance).

A thermosetting resin, for example, may be used as the binder resin. Specifically, the binder resin includes at least one of a polyamideimide (PAI) resin, a polyimide (PI) resin, a polyamide resin, an epoxy resin, a phenolic resin, a polyacetal resin, a polyetheretherketone resin, and a polyphenylene sulfide resin.

The solid lubricant is added in order to improve the frictional characteristics. The solid lubricant includes at least one of $MoS_2$, $WS_2$, polytetrafluoroethylene (PTFE), graphite, h-BN, and $SB_2O_3$, for example. For example, $MoS_2$ provides good lubricity. PTFE has the effect of reducing the friction coefficient due to low intermolecular cohesion. Furthermore, graphite improves wettability and improves initial conformability. Initial conformability refers to the property of allowing a sliding surface to be worn and become smooth when coming into sliding contact with a mating material after the start of sliding, thereby improving the slidability. When the slidability is improved due to the development of initial conformability, the overall wear volume of a sliding layer is reduced.

The hard material is added in order to improve the wear resistance. The hard material includes, for example, at least one of SiC, $Al_2O_3$, TiN, AlN, $CrO_2$, $Si_3N_4$, $ZrO_2$, and $Fe_3P$.

Figure 2:
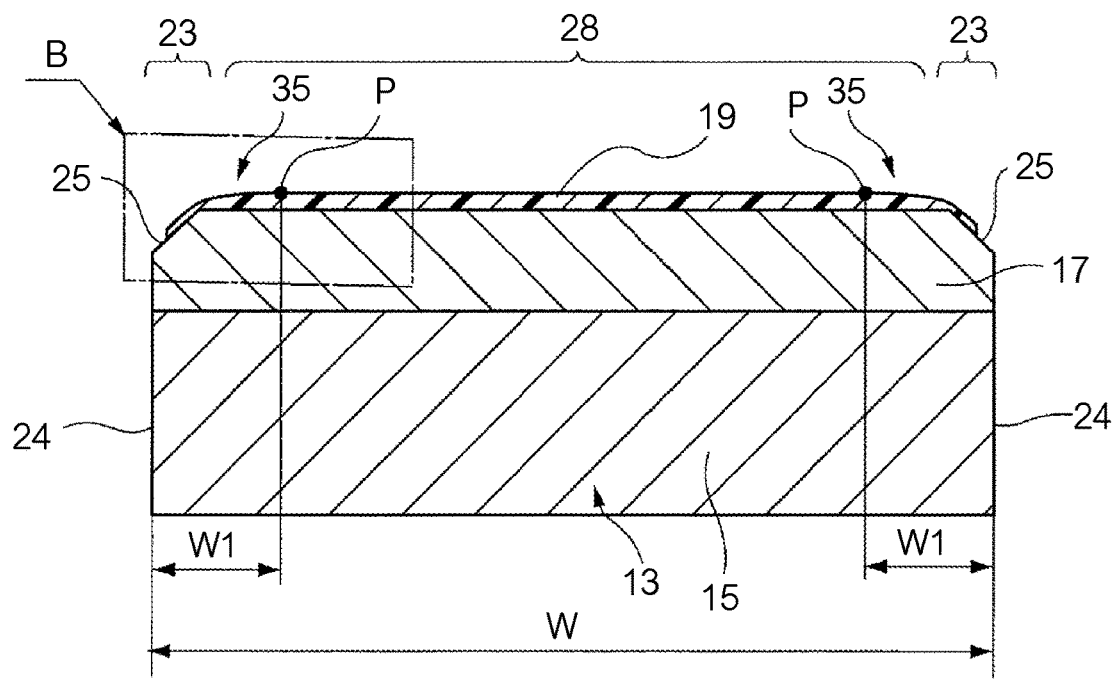
FIG. 2 is a cross-sectional view, taken in the direction of arrows A-A, of half bearing 13.

FIG. 2 is a schematic view showing a cross section, taken in the direction of arrows A-A, of half bearing 13. That is to say, FIG. 2 shows a cross section of half bearing 13 that is parallel to the axial direction (and perpendicular to a sliding direction). Although no slidable mating shaft is shown in FIG. 2, it is assumed that a mating shaft is located in an upper portion of FIG. 2. That is to say, a surface on the upper side in FIG. 2 is the sliding surface. In main bearing 11, overlay layer 19, lining layer 17, and metal backing 15 are laminated together in that order from the nearest to the mating shaft.

In half bearing 13, chamfered portions 25 are formed in end portions at opposite ends of sliding surface 28 in order to remove or prevent the formation of a burr, for example. The angle θ1 of each chamfered portion relative to sliding surface 28 is within a range of, for example, 30 to 60°.

Figure 3:
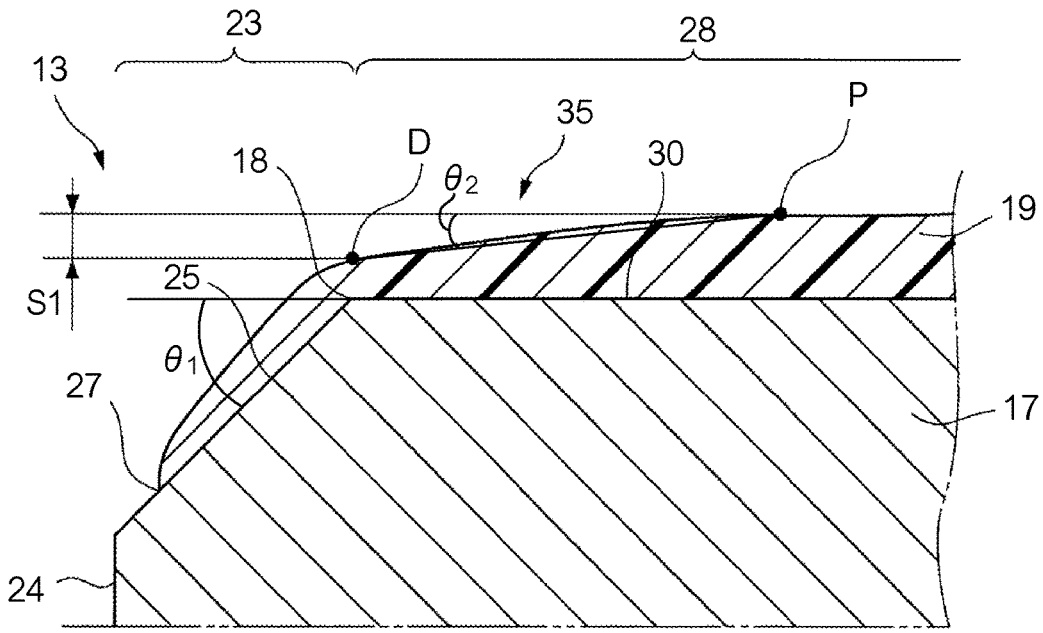
FIG. 3 is a partial enlarged cross-sectional view of half bearing 13.

FIG. 3 is an enlarged view of portion B in FIG. 2. Overlay layer 19 extends in the axial direction (left-right direction in FIG. 2) and covers sliding surface 28 and at least a portion of chamfered portion 25. That is to say, overlay layer 19 is formed in such a position in which the load of the mating shaft is not applied to interface 27 with lining layer 17. The "position in which the load of the mating shaft is not applied" as used herein refers to a position in which overlay layer 19 covers at least a portion of chamfered portion 25.

Also, overlay layer 19 has a crowning shape. The crowning shape refers to a gently sloping shape. The angle θ2 of slope is within a range of, for example, 0 to 10°. Overlay layer 19 slopes from a slope starting position P toward end portion 23 with respect to the axial direction. For slope starting position P, the distance w1 from end surface 24 with respect to the axial direction to slope starting position P satisfies w1<W/2, where W represents the distance (i.e., width of the bearing) between two end surfaces 24 with respect to the axial direction.

Here, it is preferable that the difference in film thickness (difference in height of overlay layer 19) S1 between slope starting position P and position D of the end portion of sliding surface 28 with respect to the axial direction is equal to or less than 6 μm. Frictional resistance between slope starting position P and the mating shaft can be suppressed by limiting the difference in film thickness to this range.

Figure 4:
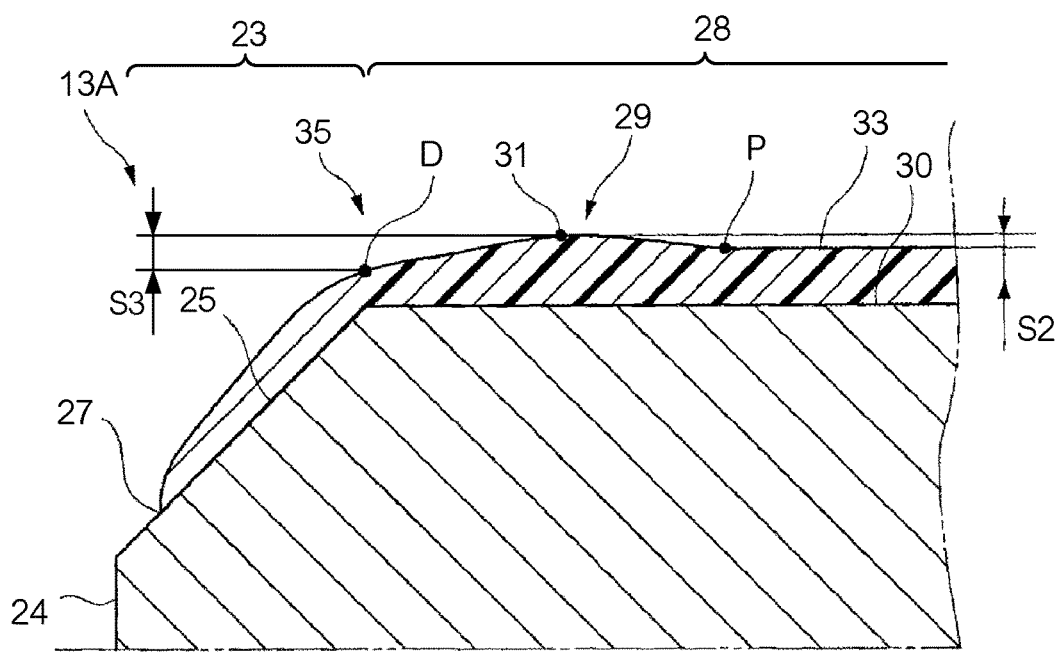
FIG. 4 is another example of the partial enlarged cross-sectional view of half bearing 13.

FIG. 4 illustrates another shape of the end portion with respect to the axial direction. In this example, overlay layer 19 has bulge portion 29. Bulge portion 29 is the portion whose height (film thickness) is larger than that of the other portions. Bulge portion 29 is located on the outer side relative to slope starting position P (located closer to the end portion than slope starting position P is). For slope starting position P, the distance w1 from end surface 24 with respect to the axial direction to slope starting position P satisfies w1<W/2, where W represents the distance between two end surfaces 24 with respect to the axial direction. It is preferable that the difference S2 in height between apex 31 of bulge portion 29 and any other portion of overlay layer 19 is equal to or less than 6 μm. It should be noted that the height of the other portion of overlay layer 19 refers to a representative value of the height of those portions of overlay layer 19 other than bulge portion 29 and may be an average value, for example. Alternatively, the height of a central portion of overlay layer 19 with respect to the axial direction may be used as the representative value.

Moreover, in this example, it can be said that crowning of overlay layer 19 starts from apex 31 of bulge portion 29. Accordingly, it is preferable that the difference S3 in film thickness between apex 31 of bulge portion 29 and position D of the end portion with respect to the axial direction is equal to or less than 6 μm.

With respect to the structure shown in FIG. 4, if a highly oleophilic resin is used as the material for overlay layer 19, a lubricating oil is more easily held in oil holding portion 33 between an inner circumferential surface of main bearing 11 and the mating shaft when the engine is stopping. Moreover, the lubricating oil can also be more easily introduced into a space between the mating shaft and main bearing 11 during activation. This results in an increase in oil film thickness, and thus the contact between the mating shaft and the main bearing 11 during activation is alleviated.

Figure 5:
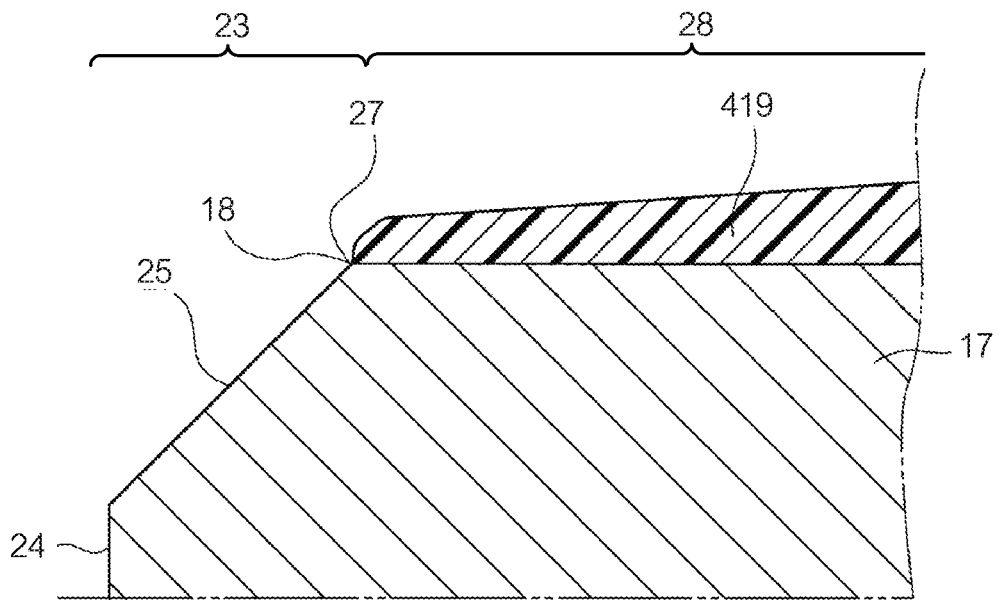
FIG. 5 is a partial enlarged cross-sectional view of a sliding member according to a related art.
Figure 6:
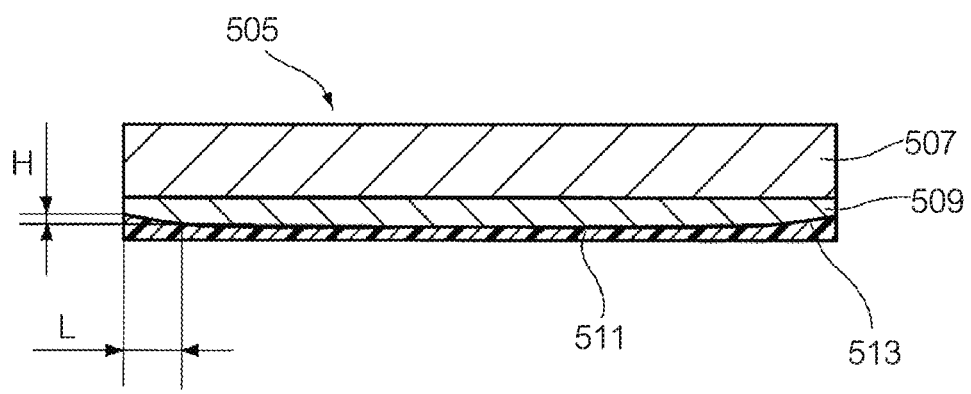
FIG. 6 is a cross-sectional view of a half bearing according to a conventional technology.

FIG. 5 shows the structure of a sliding member according to a related art. FIG. 5 is an enlarged view at a position corresponding to portion B in FIG. 2. In this example, overlay layer 419 is formed on lining layer 17. Overlay layer 419 is not formed on chamfered portion 25 and is formed only on sliding surface 28. That is to say, overlay layer 419 is formed on the inner side relative to end position 18 (boundary between sliding surface 28 and chamfered portion 25) of sliding surface 28. That is to say, it can be said that in this example, an end portion of overlay layer 419 is formed in such a position in which the load of the mating shaft is likely to be applied thereto.

In contrast, according to the present embodiment, overlay layer 19 is formed extending to chamfered portion 25. Accordingly, when compared with the structure shown in FIG. 5, the close contact area between overlay layer 19 and the base material (lining layer 17) increases, and thus the close contact amount increases. In an end portion of the overlay layer, there is a possibility that the lubricating oil may enter the end portion from the interface with the base material, resulting in separation of the overlay layer. However, according to the present embodiment, since the interface with overlay layer 19 is not exposed in the vicinity of sliding surface 28, the possibility of the entry of the lubricating oil can be reduced when compared with the structure shown in FIG. 5. Furthermore, since the interface between overlay layer 19 and lining layer 17 is formed in such a position in which the load of the mating shaft is unlikely to be applied to this interface, film separation that may be caused by the load of the mating shaft can be reduced. Furthermore, since the possibility of chamfered portion 25 sliding relative to the mating shaft is small, that portion of overlay layer 19 that covers chamfered portion 25 has only a small influence on the sliding characteristics. That is to say, it is possible to form overlay layer 19 without requiring much cost for this portion.

2. Manufacturing Method

A method for manufacturing a bearing according to an embodiment includes the following steps:

(a) preparing an overlay precursor containing a solid lubricant and a binder resin;

(b) forming a bearing base material;

(c) applying the overlay precursor onto the bearing base material;

(d) drying the overlay precursor; and (e) baking the overlay precursor.

In step (a) of preparing the overlay precursor, there is no particular limitation on the method for mixing the solid lubricant with the binder resin, and a known method can be used. For example, the solid lubricant and the binder resin are loaded into a kneader and mixed under the conditions of a shear rate of 0.1 to 2 m/s, and thus the overlay precursor is adjusted.

To prepare the overlay precursor, the binder resin may be incompatible, but from the standpoint of practical application, it is preferable that the binder resin is at least partially compatible. Compatibility may be achieved by performing mechanical blending while applying high shear.

In step (b), a metal backing and a bearing alloy layer are, for example, pressure-welded to form a bearing base material. Furthermore, the bearing base material is processed into a predetermined shape, for example, a cylindrical shape or a semi-cylindrical shape.

In step (c), when applying the overlay precursor (coating material) onto the bearing base material, it is preferable to use a diluent so as to allow the solid lubricant and the binder resin to be uniformly dispersed. Although there is no particular limitation on the diluent, N-methylpyrrolidone (NMP) may be used, for example. Moreover, the mixing ratio of the diluent may be, for example, 30 to 70 vol % with respect to the solid content.

When applying and forming a film of the overlay precursor onto the bearing alloy layer, a known method such as pad printing of the coating, screen printing, air spraying, airless spraying, electrostatic coating, tumbling, a squeezing method, a roll method, or the like is used. Moreover, with respect to all of the film-forming methods, if the film thickness is insufficient, it is possible to perform recoating a plurality of times rather than increasing the concentration of the overlay layer in the diluent.

Examples of the method for coating lining layer 17 with overlay layer 19 include spray coating and coating that is performed using a roll. In the case where spray coating is used, bulging of end portions 35 of sliding surface 28 with respect to the axial direction can be suppressed by applying a thin layer of a precursor solution several times. That is to say, localized contact between the mating shaft and bulge portion 29 of resin overlay layer 19 and resultant seizure can be prevented. The end portions with respect to the axial direction and portions other than these end portions can be coated separately by adjusting the spray angle of spray coating, and thus the crowning shape can be formed. In this case as well, bulging of the end portions with respect to the axial direction due to surface tension can be suppressed by applying a thin layer of the precursor solution several times as described above.

As another example, in the case where coating that is performed using a roll is adopted, a roll having a shape that conforms to a desired overlay shape is used. It should be noted that for coating of chamfered portions 25, a roll having a width in the axial direction that is substantially equal to the length of the inner circumferential surface of sliding surface 28 in the axial direction may be used and a coating solution that is squeezed out from opposite ends of the roll used as is. This is because considerable tolerances can be provided with respect to the shape and the thickness of the coating of chamfered portions 25.

In step (d), the diluent is removed by drying the overlay precursor. Conditions such as the drying time, the drying temperature, and the like are not particularly limited as long as the diluent can be dried, but preferably, the overlay precursor is dried at 50 to 150° C. in the atmosphere for 5 minutes to 30 hours. More preferably, the drying time is 5 to 30 minutes.

Baking in step (e) can provide a bearing in which an overlay layer is formed. Specifically, for example, the temperature of the bearing base material after step (d) is gradually increased to a baking temperature at a rate of temperature rise of 5 to 15° C./minute, and then the bearing base material is baked at 150 to 300° C. in the atmosphere for 0.2 to 1.5 hours.

3. Examples

Samples (Working Examples 1 to 8 and Comparative Examples 1 to 5) that varied in terms of the difference d in film thickness (difference in height) of overlay layer 19 and slope starting position P were produced, and the starting torque and the seizure surface pressure of these samples were measured. It should be noted that the starting torque is an index that indicates the thickness of an oil film formed between mating shaft 23 and main bearing 11. It is difficult to directly measure the thickness of an oil film, and for this reason the starting torque was measured as the index that indicates the thickness of the oil film. A smaller starting torque indicates a thicker oil film. The seizure surface pressure is an index that indicates the seizure resistance. A higher seizure surface pressure indicates superior seizure resistance. A high seizure surface pressure indicates that separation of the overlay layer is less likely to occur.

3-1. Production of Samples

First, the samples were produced in the following manner. An aluminum alloy serving as lining layer 17 was pressure-welded to metal backing 15 made of steel. This material was processed into a half-cylindrical shape. Materials for overlay layer 19 were diluted with a solvent (N-methyl-2-pyrrolidone) to adjust a coating solution. This coating solution was applied by air spraying to form a coating. Then, after drying at 100° C. for 20 minutes, baking was performed at 200° C. for 60 minutes.

Characteristics that are shared by Examples 1 to 7 and Comparative Examples 1 to 4 are as follows:

Bearing width K: 15 mm

Film thickness at the center of overlay layer: 6 μm

Ingredients of overlay layer: binder resin (PAI) 58 vol % solid lubricant (graphite) 40 vol % hard material (SiC) 1 vol %

The difference h in film thickness of overlay layer 19 and slope starting position P for each sample are shown in Table 1.

3-2. Measurement of Starting Torque

A rotary load testing machine manufactured by Shinko Engineering Co., Ltd. was used for measurement of the starting torque. This testing machine is constituted by two sets of test bearing portions that are attached to a housing and a load applying housing that is connected to a shaft by a ball bearing, and a mating shaft is connected to a driving motor via a torque meter. The oil is fed to the testing portions from the housing through an oil hole of the bearing. The same oil as an engine oil used for measurement of the contact angle was used as the lubricating oil. The feed oil temperature was set at 30° C. The operation pattern was set to be start-stop, and in a single cycle of 20 seconds, acceleration (1.7 m/s) to a shaft rotation speed of 700 rpm and the following constant-speed operation were performed for 10 seconds, and deceleration and stopping were performed for 10 more seconds. A load of 2000 N (1.2 MPa) was continuously applied. The number of cycles was set at 180 cycles, and the testing time was set at 1 hour. In measurement of the starting torque, a torque peak value that occurs during activation is measured; however, since the torque significantly varies in an early stage of the test, the final 20 cycles were used as the target, and the comparison and evaluation were performed using an average value of measurement values with respect to those 20 cycles.

3-3. Measurement of Seizure Surface Pressure

A seizure test was performed under the following conditions, and a surface pressure at which seizure occurred was measured as the seizure surface pressure:

Number of revolutions: 8000 rpm
Lubricating oil: 0 W-20
Feed oil temperature: 140° C.
Load: load was increased every 3 minutes in increments of 3 kN.

3-4. Evaluation Results

Table 1 shows the evaluation results.

TABLE 1

|  |  | Difference in height (μm) | Slope starting position w1/W | Starting torque (Nm) | Seizure surface pressure (MPa) |
|---|---|---|---|---|---|
| Working Examples | 1 | 1 | 1/3 | 1.6 | 85.7 |
|  | 2 | 1 | 1/5 | 1.7 | 81.3 |
|  | 3 | 3 | 1/3 | 1.5 | 85.7 |
|  | 4 | 3 | 1/4 | 1.5 | 89.9 |
|  | 5 | 3 | 1/5 | 1.6 | 85.7 |
|  | 6 | 6 | 1/3 | 1.7 | 85.7 |
|  | 7 | 6 | 1/4 | 1.7 | 85.7 |
|  | 8 | 6 | 1/5 | 1.7 | 81.3 |
| Comparative Examples | 1 | 0 | — | 2.0 | 72.8 |
|  | 2 | 3 | 1/2 | 2.1 | 68.5 |
|  | 3 | 7 | 1/3 | 2.1 | 68.5 |
|  | 4 | 7 | 1/4 | 2.2 | 68.5 |
|  | 5 | 7 | 1/5 | 2.1 | 68.5 |

The samples (Working Examples 1 to 8) in which the difference in height was 1 to 6 μm and the slope starting position w/W was less than ½ all exhibited favorable characteristics of the starting torque being less than 2.0 Nm and the seizure surface pressure being 80 MPa or more. In contrast, the samples (Comparative Examples 1 and 2) in which the slope starting position w/W was ½ or more all showed a starting torque of 2.0 Nm or more, and the seizure surface pressure was below 80 MPa. Moreover, the samples (Comparative Examples 3 to 5) in which the difference in height was 7 μm or more all showed a starting torque of 2.1 Nm or more, and the seizure surface pressure was below 70 MPa.

REFERENCE SIGNS LIST

11 Main bearing
13 Half bearing
15 Metal backing
17 Lining layer
19 Overlay layer
23 End portion with respect to axial direction
24 End surface with respect to axial direction
25 Chamfered portion
27 Interface
28 Sliding surface
29 Bulge portion
31 Apex
33 Oil holding portion
419 Overlay layer

What is claimed is:

1. A sliding member comprising:
a lining layer having a sliding surface that slides relative to a mating shaft and a chamfered portion that is provided in an end portion of the sliding surface with respect to an axial direction; and
an overlay layer that is formed of a resin and that covers the sliding surface and only part of the chamfered portion.

2. The sliding member according to claim 1,
wherein the overlay layer comprises:
a binder resin; and
at least one of a solid lubricant and a hard material.

3. The sliding member according to claim 2,
wherein the hard material comprises at least one of SiC, $Al_2O_3$, TiN, AlN, $CrO_2$, $Si_3N_4$, $ZrO_2$, and P.

4. The sliding member according to claim 2,
wherein the solid lubricant comprises at least one of $MoS_2$, PTFE, graphite, $WS_2$, h-BN, and $SB_2O_3$.

5. The sliding member according to claim 4,
wherein the hard material comprises at least one of SiC, $Al_2O_3$, TiN, AlN, $CrO_2$, $Si_3N_4$, $ZrO_2$, and P.

6. The sliding member according to claim 2,
wherein the binder resin comprises at least one of a polyamideimide resin, a polyimide resin, an epoxy resin, a phenolic resin, a polyacetal resin, a polyetheretherketone resin, and a polyphenylene sulfide resin.

7. The sliding member according to claim 6,
wherein the solid lubricant comprises at least one of $MoS_2$, PTFE, graphite, $WS_2$, h-BN, and $SB_2O_3$.

8. The sliding member according to claim 6,
wherein the hard material comprises at least one of SiC, $Al_2O_3$, TiN, AlN, $CrO_2$, $Si_3N_4$, $ZrO_2$, and P.

9. The sliding member according to claim 1,
wherein the overlay layer has a crowning shape that slopes toward the end portion with respect to the axial direction from a slope starting position that is a position at which a distance from an end surface with respect to the axial direction is shorter than W/2, W being a width of the lining layer in the axial direction.

10. The sliding member according to claim 9,
wherein the overlay layer comprises:
a binder resin; and
at least one of a solid lubricant and a hard material.

11. The sliding member according to claim 10,
wherein the hard material comprises at least one of SiC, $Al_2O_3$, TiN, AlN, $CrO_2$, $Si_3N_4$, $ZrO_2$, and P.

12. The sliding member according to claim 10,
wherein the solid lubricant comprises at least one of $MoS_2$, PTFE, graphite, $WS_2$, h-BN, and $SB_2O_3$.

13. The sliding member according to claim 12,
wherein the hard material comprises at least one of SiC, $Al_2O_3$, TiN, AlN, $CrO_2$, $Si_3N_4$, $ZrO_2$, and P.

14. The sliding member according to claim 10,
wherein the binder resin comprises at least one of a polyamideimide resin, a polyimide resin, an epoxy resin, a phenolic resin, a polyacetal resin, a polyetheretherketone resin, and a polyphenylene sulfide resin.

15. The sliding member according to claim 14,
wherein the solid lubricant comprises at least one of $MoS_2$, PTFE, graphite, $WS_2$, h-BN, and $SB_2O_3$.

16. The sliding member according to claim 14,
wherein the hard material comprises at least one of SiC, $Al_2O_3$, TiN, AlN, $CrO_2$, $Si_3N_4$, $ZrO_2$, and P.

17. The sliding member according to claim 9,
wherein in the overlay layer, a difference in height between the slope starting position and a position of the end portion of the sliding surface with respect to the axial direction is not more than 6 μm.

18. The sliding member according to claim 17,
wherein the overlay layer comprises:
a binder resin; and
at least one of a solid lubricant and a hard material.

19. The sliding member according to claim 18,
wherein the hard material comprises at least one of SiC, $Al_2O_3$, TiN, AlN, $CrO_2$, $Si_3N_4$, $ZrO_2$, and P.

20. The sliding member according to claim 18,
wherein the solid lubricant comprises at least one of $MoS_2$, PTFE, graphite, $WS_2$, h-BN, and $SB_2O_3$.

21. The sliding member according to claim 20,
wherein the hard material comprises at least one of SiC, $Al_2O_3$, TiN, AlN, $CrO_2$, $Si_3N_4$, $ZrO_2$, and P.

22. The sliding member according to claim 18,
wherein the binder resin comprises at least one of a polyamideimide resin, a polyimide resin, an epoxy resin, a phenolic resin, a polyacetal resin, a polyetheretherketone resin, and a polyphenylene sulfide resin.

23. The sliding member according to claim 22,
wherein the solid lubricant comprises at least one of $MoS_2$, PTFE, graphite, $WS_2$, h-BN, and $SB_2O_3$.

24. The sliding member according to claim 22,
wherein the hard material comprises at least one of SiC, $Al_2O_3$, TiN, AlN, $CrO_2$, $Si_3N_4$, $ZrO_2$, and P.

\* \* \* \* \*